(12) United States Patent
Darby

(10) Patent No.: US 11,679,862 B2
(45) Date of Patent: Jun. 20, 2023

(54) MANUAL BRAKE OVERRIDE

(71) Applicant: Goodrich Actuation Systems Limited, Solihull West Midlands (GB)

(72) Inventor: Jonathan A. Darby, Westlands (GB)

(73) Assignee: GOODRICH ACTUATION SYSTEMS LIMITED, Solihull (GB)

(*) Notice: Subject to any disclaimer, the term of this patent is extended or adjusted under 35 U.S.C. 154(b) by 127 days.

(21) Appl. No.: 17/166,360

(22) Filed: Feb. 3, 2021

(65) Prior Publication Data

US 2021/0245863 A1 Aug. 12, 2021

(30) Foreign Application Priority Data

Feb. 10, 2020 (EP) .................................. 20275034

(51) Int. Cl.
| | |
|---|---|
| *B64C 3/56* | (2006.01) |
| *B64C 13/50* | (2006.01) |
| *B64C 13/04* | (2006.01) |
| *B64C 23/06* | (2006.01) |

(52) U.S. Cl.
CPC .............. *B64C 3/56* (2013.01); *B64C 13/042* (2018.01); *B64C 13/505* (2018.01); *B64C 23/072* (2017.05)

(58) Field of Classification Search
CPC ....... B64C 3/56; B64C 13/505; B64C 13/042; B64C 23/072; E05F 15/605
See application file for complete search history.

(56) References Cited

U.S. PATENT DOCUMENTS

| | | | |
|---|---|---|---|
| 2,609,165 | A | 9/1952 | Hill |
| 4,261,224 | A | 4/1981 | Sulzer |
| 4,616,528 | A | 10/1986 | Malinski et al. |
| 4,892,360 | A | 1/1990 | Tysver |
| 5,381,986 | A | 1/1995 | Smith et al. |
| 7,536,889 | B1* | 5/2009 | Mueller ................. B21D 19/02 72/101 |
| 9,523,416 | B2 | 12/2016 | Hudson et al. |
| 2010/0257999 | A1* | 10/2010 | Domholt ................. F41A 23/24 89/41.02 |
| 2013/0220207 | A1* | 8/2013 | Mueller ................. B63B 27/146 114/362 |

(Continued)

FOREIGN PATENT DOCUMENTS

| | | |
|---|---|---|
| EP | 2862797 A1 | 4/2015 |
| EP | 3360779 A1 | 8/2018 |
| GB | 2574603 A | 12/2019 |

OTHER PUBLICATIONS

Extended European Search Report for International Application No. 20275034.5 dated Aug. 21, 2020, 10 pages.

*Primary Examiner* — Rodney A Bonnette
(74) *Attorney, Agent, or Firm* — Cantor Colburn LLP

(57) ABSTRACT

A manual brake override system includes a gear system, an electric motor in operative communication with the input of the gear system, a holding brake in operative communication with the input of the gear system. The holding brake is configured to prevent movement within the gear system when engaged. A manual handwind is provided in operative communication with the input of the gear system and the manual handwind and holding brake are configured such that the input of the gear system can be driven, with the manual handwind, whilst the holding brake is engaged.

20 Claims, 1 Drawing Sheet

(56) References Cited

U.S. PATENT DOCUMENTS

| | | | |
|---|---|---|---|
| 2015/0143932 A1* | 5/2015 | Igarashi | B62D 37/06 |
| | | | 74/5.4 |
| 2015/0210377 A1* | 7/2015 | Good | B64C 3/56 |
| | | | 244/49 |
| 2017/0023031 A1 | 1/2017 | Wildman | |
| 2017/0152017 A1* | 6/2017 | Good | B64C 3/56 |
| 2017/0355442 A1* | 12/2017 | Winkelmann | B64C 3/56 |

* cited by examiner

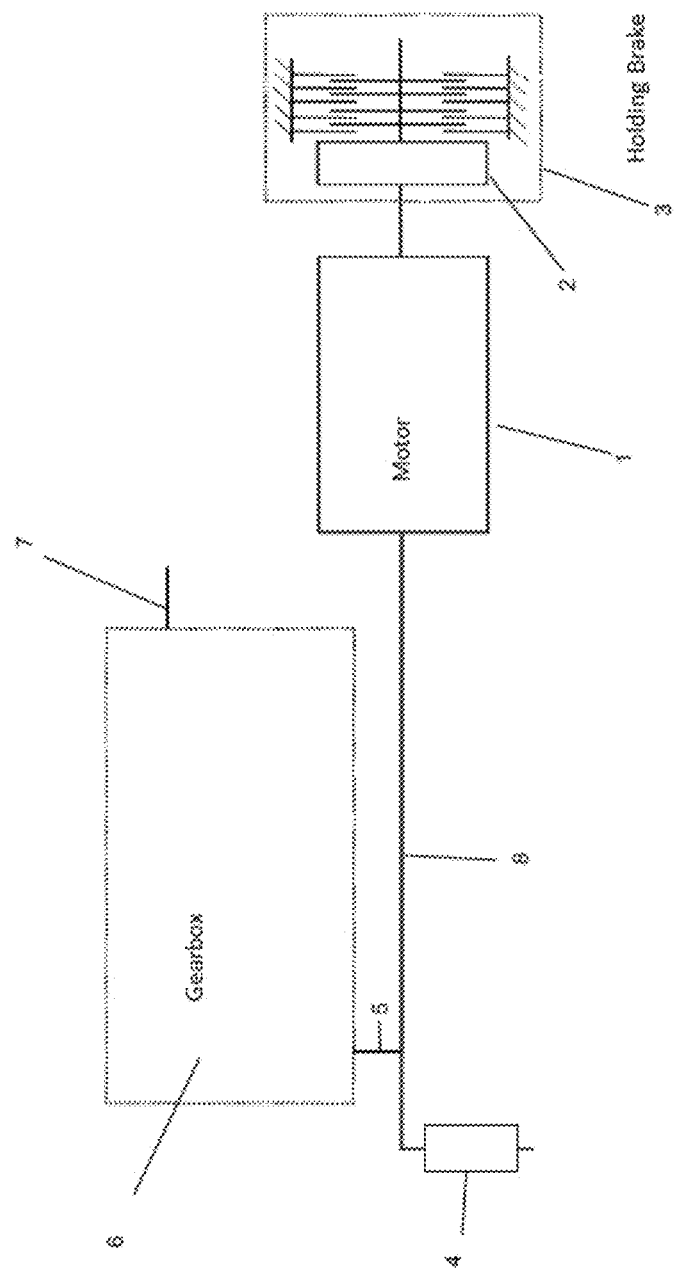

MANUAL BRAKE OVERRIDE

FOREIGN PRIORITY

This application claims priority to European Patent Application No. 20275034.5 filed Feb. 10, 2020, the entire contents of which is incorporated herein by reference.

BACKGROUND OF THE INVENTION

Owing to evolving requirements in the aerospace industry, aeroplanes are being manufactured to have even greater wingspans than previously. One of the problems associated with this is the relatively small size of aircraft hangars at airports or on aircraft carriers. When the wingspan of an aircraft is greater than the width of the hangar, the aircraft cannot be housed inside. One innovation which has been presented and utilised to solve this problem is folding wings. With use of a rotary actuator, the end portions of each wing of an aircraft can be folded inwards, towards the fuselage, decreasing the overall width of the aircraft and therefore enabling the aircraft to fit into the hangar. Such rotary actuators are typically powered by on-board electronics. However, in the event of electrical failure, or during maintenance operations, the rotary actuators must be manually operated. Known systems incorporate a power off brake to the rotary actuator, which, for safety purposes, acts to lock the mechanism when it is depowered. This presents a problem in that the actuator cannot be manually driven whilst the brake is active. Under maintenance operations, an additional brake release mechanism is required in order to disengage the brake such that the actuator can be driven manually. This adds complexity to the procedure and presents safety risks. The present disclosure provides a manual brake override system which aims to overcome the problems arising from known systems.

SUMMARY OF THE INVENTION

According to one aspect of the invention, there is a provided a manual brake override system comprising a gear system, an electric motor in operative communication with the input of the gear system, a holding brake in operative communication with the input of the gear system, configured to prevent movement within the gear system when engaged and a manual handwind in operative communication with the input of the gear system. The manual handwind and holding brake are configured such that the input of the gear system can be driven, with the manual handwind, whilst the holding brake is engaged.

According to another example, the gear system, electric motor, holding brake and manual handwind may form part of an actuator.

According to another example, the actuator may be a rotary actuator.

According to another example, the gear system may be a multi-stage gearbox.

According to another example, the electric motor and the holding brake may be connected in series along an axle.

According to another example, the holding brake may be configured such that it is engaged when depowered.

According to another example, the holding brake may be configured to provide a braking torque $\tau_{brake}$ and the manual handwind may be configured such that it can impart a torque, $\tau_{handwind}$ which is greater than $\tau_{brake}$, in response to a manually applied torque $\tau_{manual}$ applied through the manual drive handwind.

According to another example, the ratio of the manually applied torque manual and the imparted torque by the handwind $\tau_{handwind}$ may be greater than 5.1.

According to another aspect, an aircraft is provided which includes a manual brake override system as described above.

According to another example of the aircraft, in examples where the manual brake override system comprises a rotary actuator, the rotary actuator is used to fold a wing of the aircraft.

According to another aspect of the present invention, a method is provided, comprising the steps of providing a gear system; providing an electric motor in operative communication with the input of the gear system; providing a holding brake in operative communication with the input of the gear system, configured to prevent movement within the gear system when engaged; providing a manual handwind in operative communication with the input of the gear system; and manually driving the input of the gear system whilst the holding brake is engaged.

According to an example of the method, the gear system, electric motor, holding brake and manual handwind may form part of an actuator.

According to another example of the method, said actuator is a rotary actuator.

According to another aspect of the present invention, a method of manually operating a folding wing of an aircraft is provided, comprising using the above methods to manually fold a wing of an aircraft.

BRIEF DESCRIPTION OF DRAWINGS

FIG. 1 shows an example of a manual brake override system according to the present invention.

DETAILED DESCRIPTION

Folding wing mechanisms for aircraft typically utilise electrically-powered rotary actuators to fold portions of the wing. Such rotary actuators comprise an electrical motor, which drives a multi-stage gearbox. The output 7 (see FIG. 1) of the multi-stage gearbox drives the wing portion into a folded state. A holding brake is also provided in the rotary actuator. The holding brake is powered by an electrical solenoid, such that, under normal operations, the solenoid is powered and the holding brake released, enabling the actuator to be driven. In the event of electrical failure or under maintenance procedures, i.e. non-operating conditions, the rotary actuator is no longer able to be electrically driven. Instead, the actuator must be manually driven. In these cases, the power off holding brake is activated/engaged. The high braking force from the engagement of the holding brake prevents the multi-stage gearbox of the rotary actuator from being driven manually.

The present invention provides a manual drive gear arrangement for a rotary actuator. In this arrangement, a manual drive handwind 4 is geared and sized to manually overcome the holding brake without the need to release it. As illustrated by FIG. 1, the manual drive handwind 4 is positioned such that it directly drives the input 5 to a gearbox 6. It should be understood that the nature and arrangement of the gearbox may vary and is not essential to the invention. The gearbox 6 may be a multi-stage gearbox. The gearbox 6 may also be a single-stage gearbox. As can be seen from the FIGURE, the electric motor 1 and the holding brake 3 are connected in series along a common axle 8. The axle 8 is connected at one end to the input 5 of the gear system 6. It is also envisaged that the electric motor may not share an axle with the holding brake but is otherwise in geared connection with the input 5 of the gearbox 6. The holding brake 3 is configured such that it is engaged when no power is supplied thereto, and released when powered. In one example, this is achieved by use of a solenoid 2, which acts to work against a mechanical bias to separate the brake plates. Alternative configurations providing brake release when the brake is powered and engagement in response to depowering are also envisaged.

As can be seen by FIG. 1, the manual drive handwind 4 is in geared communication the input 5 of the gearbox 6. The manual drive handwind 4 may be in direct communication with the axle 8 upon which the holding brake is mounted or may be connected directly to the input 5 of the gear system 6. The manual drive handwind 4 is geared and sized such that it can manually overcome the brake force due to the power off friction holding brake 3 without the need to release it.

According to the present invention, the holding brake 3, by virtue of its coupling with the input 5 of the gear system 6 via axle 8, provides a minimum frictional braking torque, $\tau_{brake}$, required to prevent involuntary movement of the rotary actuator during maintenance procedures throughout the full positional range of the actuator. This means that, when the holding brake 3 is engaged, without any externally applied forces to the rotary actuator, and in some examples to the wing or wing fold mechanism, there can be no movement of the components of the actuator. In known systems, the magnitude of the braking torque, $\tau_{brake}$, is so high that it cannot be overcome manually via a manual handwind, in order to manually drive the actuator during maintenance procedures. In these scenarios, an additional brake release mechanism is required to reduce or nullify $\tau_{brake}$. This presents problems such as the additional cost, weight and size of this additional mechanism. The use of such a mechanism also compromises safety, since, when in use, the brake is disengaged, which can lead to involuntary movement and injury to operators. In the present invention, however, the manual handwind 4 is geared such that an operator can apply a torque $\tau_{manual}$ to the manual handwind, which results in a minimum torque, $\tau_{handwind}$, being applied to the input of the gear system 6. The manual handwind 4 is geared and sized such that $\tau_{handwind} > \tau_{brake}$. This can also be expressed as a ratio: $\tau_{handwind} : \tau_{brake}$ is greater than 1:1. Similarly, the holding brake 3 is configured to ensure that the frictional braking torque $\tau_{brake}$ is lower than $\tau_{handwind}$, for even the lower than average strength operators, whilst still being of a great enough magnitude to serve its purpose of preventing involuntary movement of the actuator during maintenance. In general, the holding torque $\tau_{brake}$ of the brake is around 50 Nm and the manual drive handwind 4 is geared and sized such that the required input torque $\tau_{manual}$ to overcome the brake torque and manually operate the rotary actuator is less than 10 Nm. This means that the ratio between the output torque of the handwind $\tau_{handwind}$ the manually applied torque $\tau_{manual}$ is greater than 5:1 since 10 Nm of torque applied to the handwind results in a torque of greater than 50 Nm applied to the input of the gearbox, thereby overcoming the 50 Nm braking torque of the holding brake. Other ratios $\tau_{handwind} : \tau_{manual}$ are also envisaged, such as 2:1, 3:1, 4:1, 6:1, 7:1, 8:1, 9:1 10:1 and greater. In these cases, the braking torque $\tau_{brake}$ is always lower than $\tau_{handwind}$ so that the brake can always be overcome manually. The holding brake 3 can therefore remain fully engaged during the manual maintenance operation, under non-operating conditions. As the brake 3 is permanently engaged, sudden back driving of the panel during maintenance procedures due to, for example, the weight of components, is prevented. This greatly improves the safety of maintenance operations where manual driving is required.

In addition to improving safety and reliability, the present invention requires no additional brake release mechanism, thereby reducing cost and weight. The envelope is also reduced since no additional brake release mechanism is required, which would protrude from the unit housing when in use. The use of a manual brake release mechanism adds complexity to and reduces the reliability of the entire rotary actuator.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A manual brake override system, comprising:
   a gear system;
   an electric motor in operative communication with the input of the gear system;
   a holding brake in operative communication with the input of the gear system, configured to prevent movement within the gear system when engaged; and
   a manual handwind in operative communication with the input of the gear system;
   wherein the manual handwind and holding brake are configured such that the input of the gear system can be driven, with the manual handwind, whilst the holding brake is engaged.

2. The manual brake override system of claim 1, wherein the gear system, electric motor, holding brake and manual handwind form part of an actuator.

3. The manual brake override system of claim 2, wherein the actuator is a rotary actuator.

4. The manual brake override system of claim 1, wherein the gear system is a multi-stage gearbox.

5. The manual brake override system of claim 1, wherein the electric motor and the holding brake are connected in series along an axle.

6. The manual brake override system of claim 1, wherein the holding brake is configured such that it is engaged when depowered.

7. The manual brake override system of claim 1, wherein the holding brake is configured to provide a braking torque $\tau_{brake}$; and
   wherein the manual handwind is configured such that it can impart a torque, $\tau_{handwind}$ which is greater than $\tau_{brake}$, in response to a manually applied torque $\tau_{manual}$ applied through the manual drive handwind.

8. An aircraft, comprising:
   the manual brake override system of claim 1.

9. The aircraft of claim 8, wherein the gear system, electric motor, holding brake and manual handwind form part of a rotary actuator that is used to fold a wing of the aircraft.

10. The manual brake override system of claim 1, wherein the holding brake is configured such that it is engaged when depowered.

11. A manual brake override system, comprising:
    a gear system;
    an electric motor in operative communication with the input of the gear system;

a holding brake in operative communication with the input of the gear system, configured to prevent movement within the gear system when engaged; and a manual handwind in operative communication with the input of the gear system;

wherein the manual handwind and holding brake are configured such that the input of the gear system can be driven, with the manual handwind, whilst the holding brake is engaged;

wherein the holding brake is configured to provide a braking torque $\tau_{brake}$; and wherein the manual handwind is configured such that it can impart a torque, which is greater than, in response to a manually applied torque applied through the manual drive handwind;

wherein the ratio of the manually applied torque $\tau_{manual}$ and the imparted torque by the handwind $\tau_{handwind}$ is greater than 5:1.

12. An aircraft, comprising:

the manual brake override system of claim 8.

13. The aircraft of claim 12, wherein the gear system, electric motor, holding brake and manual handwind form part of a rotary actuator that is used to fold a wing of the aircraft.

14. The manual brake override system of claim 8, wherein the gear system, electric motor, holding brake and manual handwind form part of an actuator.

15. The manual brake override system of claim 8, wherein the gear system is a multi-stage gearbox.

16. The manual brake override system of claim 8, wherein the electric motor and the holding brake are connected in series along an axle.

17. A method comprising:

providing a gear system;

providing an electric motor in operative communication with the input of the gear system;

providing a holding brake in operative communication with the input of the gear system, configured to prevent movement within the gear system when engaged;

providing a manual handwind in operative communication with the input of the gear system; and manually driving the input of the gear system whilst the holding brake is engaged.

18. The method of claim 17, wherein the gear system, electric motor, holding brake and manual handwind form part of an actuator.

19. The method of claim 18, wherein said actuator is a rotary actuator.

20. The method of claim 17, wherein method is used manually fold a wing of an aircraft.

* * * * *